US012614139B2

(12) United States Patent
Mo et al.

(10) Patent No.: US 12,614,139 B2
(45) Date of Patent: *Apr. 28, 2026

(54) REDUCING CYBERSECURITY RISK LEVEL OF A PORTFOLIO OF COMPANIES USING A CYBERSECURITY RISK MULTIPLIER

(71) Applicant: SecurityScorecard, Inc., New York, NY (US)

(72) Inventors: Jue Mo, New York, NY (US); Luis Vargas, New York, NY (US); A. Robert Sohval, New York, NY (US)

(73) Assignee: SecurityScorecard, Inc., New York, NY (US)

( * ) Notice: Subject to any disclaimer, the term of this patent is extended or adjusted under 35 U.S.C. 154(b) by 101 days.

This patent is subject to a terminal disclaimer.

(21) Appl. No.: 18/781,942

(22) Filed: Jul. 23, 2024

(65) Prior Publication Data
US 2024/0378535 A1    Nov. 14, 2024

Related U.S. Application Data

(63) Continuation of application No. 18/299,582, filed on Apr. 12, 2023, now Pat. No. 12,079,756, which is a
(Continued)

(51) Int. Cl.
*G06Q 10/0635* (2023.01)
*H04L 9/40* (2022.01)

(52) U.S. Cl.
CPC ..... *G06Q 10/0635* (2013.01); *H04L 63/1433* (2013.01)

(58) Field of Classification Search
CPC .................. G06Q 10/0635; H04L 63/1433
See application file for complete search history.

(56) References Cited

U.S. PATENT DOCUMENTS 8,484,066 B2 * 7/2013 Miller ................... G06Q 10/08
726/23
8,918,883 B1 * 12/2014 Boyle ................... G06F 21/577
726/25
(Continued)

FOREIGN PATENT DOCUMENTS

WO    WO-2008140683 A2    11/2008

OTHER PUBLICATIONS

Patent Cooperation Treaty, International Search Report and Written Opinion issued for PCT Application No. PCT/US2018/042957, issued on Sep. 19, 2018; 7 pages.

*Primary Examiner* — Abiy Getachew
(74) *Attorney, Agent, or Firm* — Dority & Manning, P.A.

(57)    ABSTRACT

A multiplier is utilized to quantify a cybersecurity risk level of a portfolio of entities (e.g., companies) and enable actions to mitigate that quantified risk. In doing so, features or attributes of one or more companies in a portfolio are compared to features or attributes of one or more companies that experienced an adverse cybersecurity event (e.g. a data breach). Further, a degree of dependency, such as a matrix of a number of shared vendors and the proximity of those vendors to the companies, can be measured between (1) portfolio companies and one or more companies that experienced a cybersecurity event, and/or (2) the portfolio companies themselves to better quantify the risk. That is, to more meaningfully analyze a cybersecurity event that occurred at one or more companies and better predict the likelihood of an occurrence at portfolio companies, embodiments can determine an n-degree interdependency between companies.

24 Claims, 8 Drawing Sheets

Related U.S. Application Data continuation of application No. 17/240,058, filed on Apr. 26, 2021, now Pat. No. 11,657,352, which is a continuation of application No. 16/889,741, filed on Jun. 1, 2020, now Pat. No. 10,990,916, which is a continuation of application No. 16/537,321, filed on Aug. 9, 2019, now Pat. No. 10,671,957, which is a continuation of application No. 16/244,862, filed on Jan. 10, 2019, now Pat. No. 10,438,155, which is a continuation of application No. 16/019,243, filed on Jun. 26, 2018, now Pat. No. 10,217,071, which is a continuation of application No. 15/663,541, filed on Jul. 28, 2017, now Pat. No. 10,614,401.

(56) References Cited

U.S. PATENT DOCUMENTS

| | | | |
|---|---|---|---|
| 9,294,498 | B1 | 3/2016 | Yampolskiy et al. |
| 10,389,738 | B2 | 8/2019 | Muddu et al. |
| 10,417,614 | B2 | 9/2019 | Johnson et al. |
| 10,419,450 | B2 | 9/2019 | Muddu et al. |
| 10,419,465 | B2 | 9/2019 | Muddu et al. |
| 10,445,496 | B2 | 10/2019 | Gershoni et al. |
| 2004/0015376 | A1 | 1/2004 | Zhu et al. |
| 2005/0066195 | A1 | 3/2005 | Jones |
| 2006/0253709 | A1 | 11/2006 | Cheng et al. |
| 2007/0006315 | A1 | 1/2007 | Bushnaq |
| 2008/0034424 | A1 | 2/2008 | Overcash et al. |
| 2008/0133531 | A1 | 6/2008 | Baskerville et al. |
| 2008/0168529 | A1 | 7/2008 | Anderson et al. |
| 2008/0288330 | A1 | 11/2008 | Hildebrand et al. |
| 2014/0337973 | A1 | 11/2014 | Foster et al. |
| 2015/0207813 | A1 | 7/2015 | Reybok et al. |
| 2015/0229664 | A1 | 8/2015 | Hawthorn et al. |
| 2017/0048267 | A1 | 2/2017 | Yampolskiy et al. |
| 2017/0078315 | A1 | 3/2017 | Allen et al. |
| 2017/0346839 | A1 | 11/2017 | Peppe et al. |
| 2017/0346846 | A1 | 11/2017 | Findlay |
| 2018/0124114 | A1 | 5/2018 | Woods et al. |
| 2018/0146004 | A1 | 5/2018 | Belfiore, Jr. et al. |
| 2018/0359264 | A1 | 12/2018 | Sweet et al. |
| 2019/0034641 | A1 * | 1/2019 | Gil .................... G06F 21/577 |
| 2019/0141063 | A1 | 5/2019 | Hamdi |

* cited by examiner

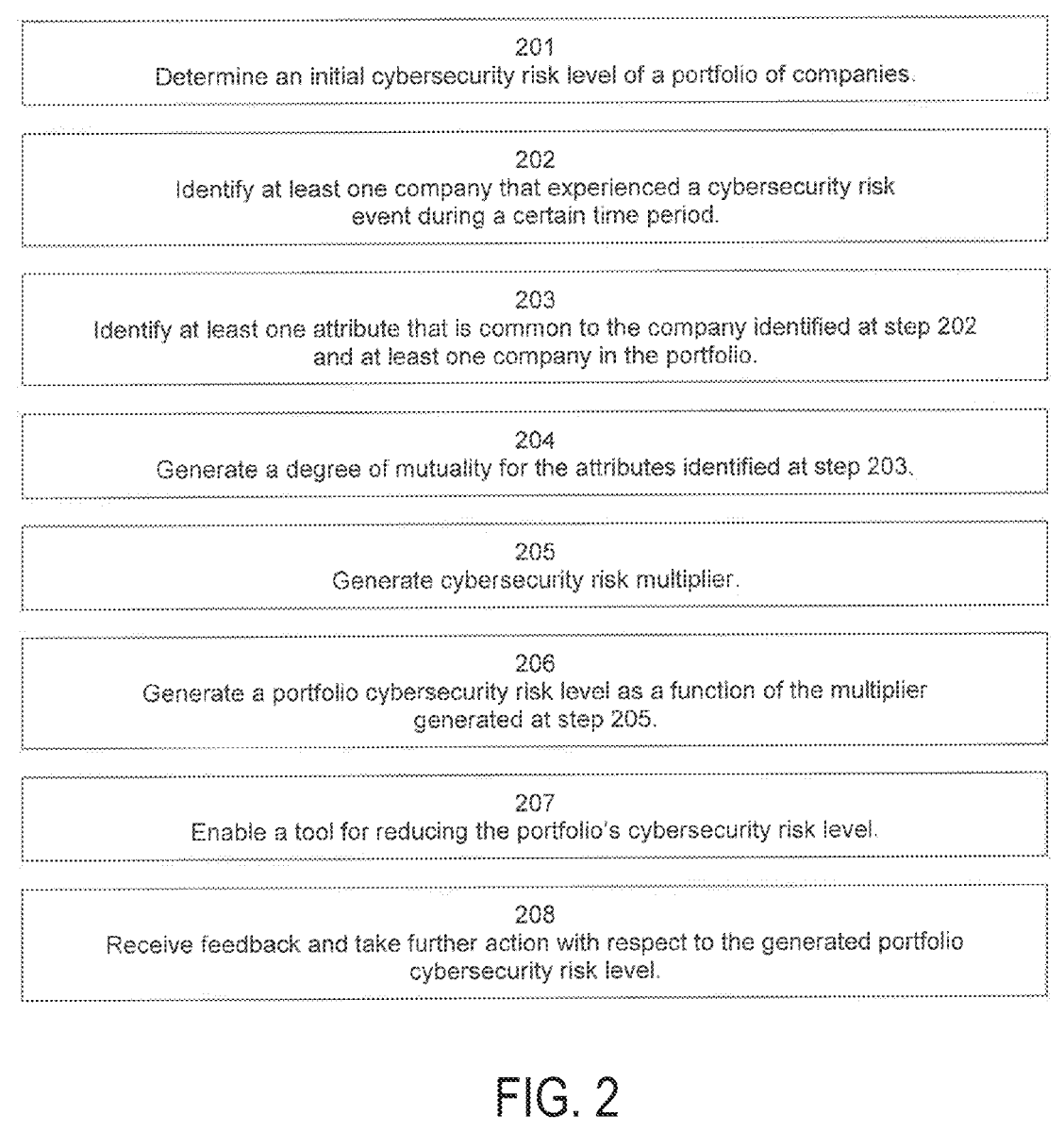

201
Determine an initial cybersecurity risk level of a portfolio of companies.

202
Identify at least one company that experienced a cybersecurity risk
event during a certain time period.

203
Identify at least one attribute that is common to the company identified at step 202
and at least one company in the portfolio.

204
Generate a degree of mutuality for the attributes identified at step 203.

205
Generate cybersecurity risk multiplier.

206
Generate a portfolio cybersecurity risk level as a function of the multiplier
generated at step 205.

207
Enable a tool for reducing the portfolio's cybersecurity risk level.

208
Receive feedback and take further action with respect to the generated portfolio
cybersecurity risk level.

FIG. 2

REDUCING CYBERSECURITY RISK LEVEL OF A PORTFOLIO OF COMPANIES USING A CYBERSECURITY RISK MULTIPLIER

CROSS REFERENCE TO RELATED PATENT APPLICATIONS

The present application is a continuation of U.S. patent application Ser. No. 18/299,582 filed Apr. 12, 2023 and entitled "REDUCING CYBERSECURITY RISK LEVEL OF A PORTFOLIO OF COMPANIES USING A CYBER-SECURITY RISK MULTIPLIER", which is a continuation of U.S. patent application Ser. No. 17/240,058 filed Apr. 26, 2021, and issued May 23, 2023 as U.S. Pat. No. 11,657,352, entitled "REDUCING CYBERSECURITY RISK LEVEL OF A PORTFOLIO OF COMPANIES USING A CYBER-SECURITY RISK MULTIPLIER", which is a continuation of U.S. patent application Ser. No. 16/889,741 filed Jun. 1, 2020, and issued Apr. 27, 2021 as U.S. Pat. No. 10,990,916, entitled "REDUCING CYBERSECURITY RISK LEVEL OF A PORTFOLIO OF COMPANIES USING A CYBER-SECURITY RISK MULTIPLIER", which is a continuation of U.S. patent application Ser. No. 16/537,321 filed Aug. 9, 2019, and issued Jun. 2, 2020, as U.S. Pat. No. 10,671,957, entitled "REDUCING CYBERSECURITY RISK LEVEL OF A PORTFOLIO OF COMPANIES USING A CYBER-SECURITY RISK MULTIPLIER"; which is a continuation of U.S. patent application Ser. No. 16/244,862 filed Jan. 10, 2019, and issued Oct. 8, 2019 as U.S. Pat. No. 10,438,155, entitled "REDUCING CYBERSECURITY RISK LEVEL OF A PORTFOLIO OF COMPANIES USING A CYBER-SECURITY RISK MULTIPLIER"; which is a continuation of Ser. No. 16/019,243 filed Jun. 26, 2018, and issued Feb. 26, 2019 as U.S. Pat. No. 10,217,071, entitled "REDUCING CYBERSECURITY RISK LEVEL OF A PORTFOLIO OF COMPANIES USING A CYBERSECURITY RISK MUL-TIPLIER"; which is a continuation of U.S. patent applica-tion Ser. No. 15/663,541 filed Jul. 28, 2017, and issued Apr. 7, 2020, as U.S. Pat. No. 10,614,401, entitled "REDUCING CYBERSECURITY RISK LEVEL OF A PORTFOLIO OF COMPANIES USING A CYBERSECURITY RISK MUL-TIPLIER"; and is related to commonly-owned U.S. patent application Ser. No. 15/198,560 filed Jun. 30, 2016, and entitled "NON-INTRUSIVE TECHNIQUES FOR DIS-COVERING AND USING ORGANIZATIONAL RELA-TIONSHIPS", the disclosures of which are hereby incorpo-rated herein by reference in their entirety.

TECHNICAL FIELD

The disclosed technology generally relates to reducing a cybersecurity risk level of a portfolio of companies. In particular, the disclosed technology relates to identifying common attributes between companies and their relevance to a cybersecurity risk for portfolio companies, quantifying the risk level using a multiplier, and enabling steps to reduce the risk level.

BACKGROUND OF THE INVENTION

A manager of a portfolio of companies may be interested in understanding the portfolio's aggregate cyber security risk level because, once understood, the manager can take action to manage or reduce that risk. Doing so can be advantageous in a number of scenarios where, e.g., an insurance company underwriting cyber-insurance needs to minimize the chance of catastrophic loss due to correlated risk, or an organization needs to minimize its exposure to breach or business interruption stemming from its vendors (e.g., third party vendor risk management). Examples of such adverse cybersecurity events include Distributed Denial of Service (DDoS) and the like, which lead to significant business interruption.

Currently available technologies for managing a portfo-lio's cybersecurity risk level suffer from certain drawbacks. For example, while certain technologies determine how diverse a set of companies may be, they do not provide meaningful information with regard to whether the compa-nies' shared features actually influence or are indicative of the occurrence of a cybersecurity risk event. In other words, known technologies do not meaningfully inform a user of a portfolio's reduced or increased correlated risk of experi-encing a cybersecurity event.

BRIEF SUMMARY OF THE INVENTION

In view of the foregoing, inventive concepts encompass a system and method for utilizing a multiplier to quantify a cybersecurity risk level of a portfolio of entities and enable actions to mitigate that quantified risk. For example, accord-ing to one embodiment, a method for reducing a cyberse-curity risk level of a portfolio of companies is provided. According to such an embodiment, at least one company that experienced a cybersecurity risk event during a certain time period is identified. Also, at least one attribute common to the at least one identified company that experienced the cybersecurity risk event and a plurality of companies in the portfolio is identified. A degree of mutuality of the at least one attribute is also identified. A cybersecurity risk multi-plier for the portfolio is generated based on (1) a number of the identified attributes, (2) a number of the plurality of companies having the identified attributes, and (3) degrees of mutuality of the number of identified attributes. Further, a portfolio cybersecurity risk level is generated that is a function of cybersecurity risk multiplier, and one or more tools are enabled for reducing the generated portfolio cyber-security risk level.

According to another embodiment, a system for reducing a cybersecurity risk level of a portfolio of companies is provided. The system comprises a memory communica-tively coupled to one or more processors configured to execute a number of steps where, e.g., at least one company that experienced a cybersecurity risk event during a certain time period is identified. Also, at least one attribute common to the at least one identified company that experienced the cybersecurity risk event and a plurality of companies in the portfolio is identified. A degree of mutuality of the at least one attribute is also identified. A cybersecurity risk multi-plier for the portfolio is generated based on (1) a number of the identified attributes, (2) a number of the plurality of companies having the identified attributes, and (3) degrees of mutuality of the number of identified attributes. Further, a portfolio cybersecurity risk level is generated that is a function of cybersecurity risk multiplier, and one or more tools are enabled for reducing the generated portfolio cyber-security risk level.

The foregoing has outlined rather broadly the features and technical advantages of the present disclosure in order that the detailed description of the disclosure that follows may be better understood. Additional features and advantages of the embodiments will be described hereinafter which form the subject of the claims of the present disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the scope of the present disclosure as set forth in the appended claims. The novel features which are believed to be characteristic of the embodiments, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE FIGURES

For a more complete understanding of the present disclosure, reference is now made to the following descriptions taken in conjunction with the accompanying figures, in which:

FIG. 2 shows aspects of a method for quantifying a cybersecurity risk level of a portfolio of companies according to an embodiment;

DETAILED DESCRIPTION OF THE INVENTION

Figure 1:
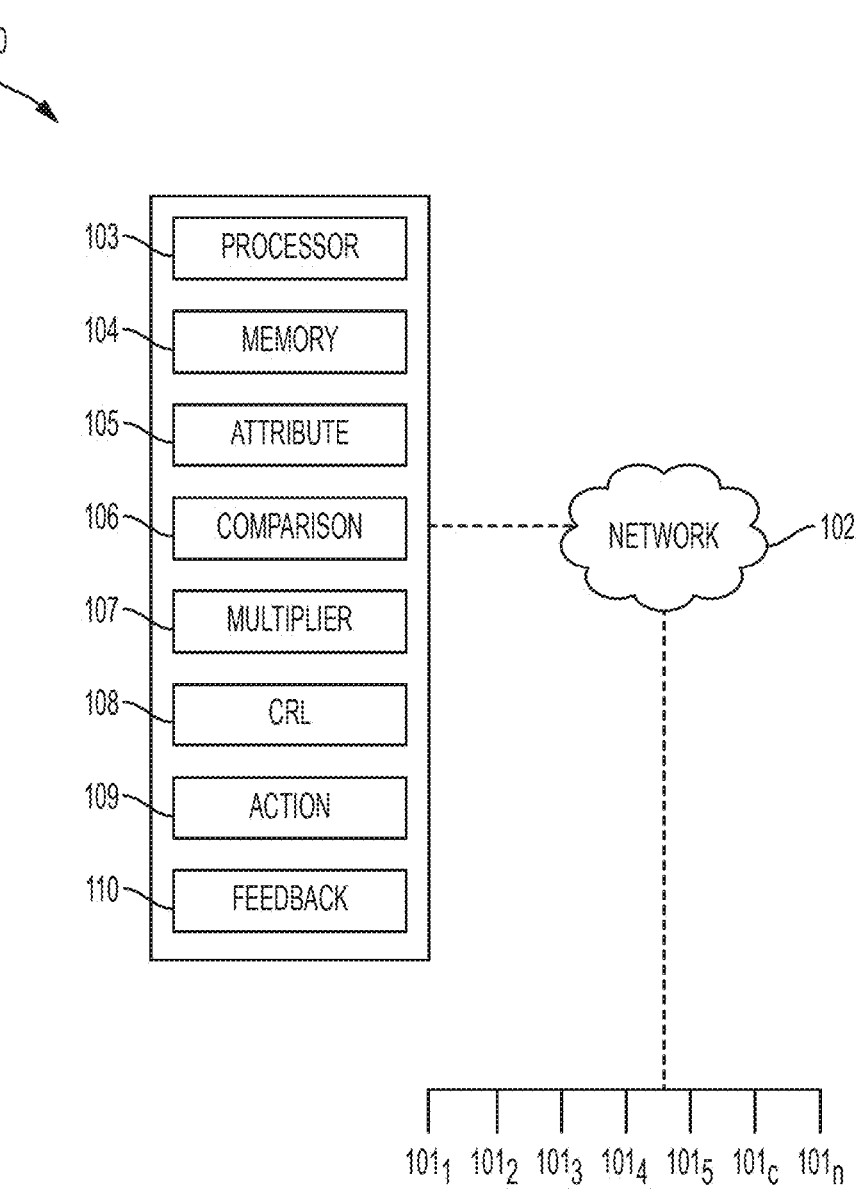
FIG. 1 shows aspects of a system that quantifies a cybersecurity risk level of a portfolio of companies according to an embodiment.

Inventive concepts utilize a multiplier to quantify a cybersecurity risk level of a portfolio of entities (e.g., companies) and enable actions to mitigate that quantified risk. In doing so, features or attributes of one or more companies in a portfolio are compared to features or attributes of one or more companies that experienced an adverse cybersecurity event (e.g. a data breach). Further, a degree of dependency, such as a matrix of a number of shared vendors and the similarity (i.e. quantity and type of shared features) of those vendors to the companies, can be measured between (1) portfolio companies and one or more companies that experienced a cybersecurity event, and/or (2) the portfolio companies themselves, to better quantify the risk. That is, to more meaningfully analyze a cybersecurity event that occurred at one or more companies and better predict the likelihood of an occurrence at portfolio companies, embodiments can determine an n-degree interdependency between companies. In other words, embodiments consider not only a number of attributes common to companies (i.e., a first-degree dependency), but also a number of features shared by the common attributes themselves (i.e., a second-degree dependency).

As an example, two or more companies can be said to have a first-degree dependency if they use the same web host. On the other hand, two or more companies may use different web hosts, but the web hosts use software from the same upstream vendor in providing their services to the two or more companies. In that case, the two or more companies can be said to have a second-degree dependency because, while they do not use the same web host, they indirectly receive software from the same upstream vendor.

Analyzing degrees of dependency between a company that experienced a cybersecurity event and companies in a portfolio, or between companies in the portfolio yet to experience such an event, facilitates treating the portfolio itself as part of a network, where the impact of an occurrence of a cybersecurity event at one point in the network (e.g., at one company) can be measured by its likely propagation through the network (e.g., to other companies in the portfolio). This can directly depend on the degree of dependency between the company that experienced the cybersecurity event and the portfolio companies.

A machine learning model is utilized to identify the most significant cybersecurity events and the most significant interdependencies between companies to predict an occurrence of a cybersecurity risk event. According to an embodiment, a supervised machine learning model is trained over a time period where, during the training period, cybersecurity events and statistically significant shared features and interdependencies are identified, prioritized, ranked, and/or assigned corresponding weight. This data can be aggregated to form feature sets and one or more algorithms can be executed to generate a multiplier, which mathematically correlates to a likelihood that one or more portfolio companies will experience a cybersecurity risk event based on their relationship to a company or companies that experienced such an event. This relationship can be characterized by shared features e.g., common vendors, common security protocols, etc.). The multiplier can be used in real-time or near real-time to understand a portfolio's risk level and various steps can be enabled to reduce that risk.

The machine learning model operates to correlate a portfolio's risk of experiencing an adverse cybersecurity event. For example, consider the scenario where a company experiences a data breach. According to embodiments, in such case, data feeds of real-time reports on data breaches are analyzed, cybersecurity features most relevant to recent breach scenarios are identified, and a probability of a "catastrophic breach" occurring for one or more companies in the portfolio is predicted based on the prevalence of the identified cybersecurity features. Users are informed of the principal cybersecurity features that have been exploited in recent cybersecurity attacks and the like, and steps are enabled to mitigate the risk of those attacks on portfolio companies. Further, instructions or recommendations to mitigate risk can be generated for display to the user or for automated execution by system components.

Embodiments also provide information and insight regarding a company's cybersecurity risk beyond tabulating individual risks associated with a company's cybersecurity posture (e.g. open ports, weak ciphers, malware infections, etc.). Accordingly, embodiments are particularly effective because they recognize that a portfolio of companies, while having relatively good tabulated cybersecurity risk scores on a per company basis, can also have a high correlated risk of experiencing a cybersecurity event. In any event, when a certain number or percentage of companies in the portfolio is at an increased risk, the portfolio itself can be considered at risk. This can be considered a correlated or systematic risk that can be mitigated by enabling a user or executing automated steps to optimize the portfolio's composition.

The foregoing features provide a system that quantifies a risk that multiple companies in a portfolio will experience a loss due to a cybersecurity event, and enables a user to take steps to mitigate that risk. This can be advantageous in a number of scenarios. For example, the inventive concepts can be utilized by a cyber insurance portfolio manager to gain quantitative insight into the probability of catastrophic loss due to multiple insured entities experiencing an adverse cybersecurity event. Also, where a user manages a portfolio of vendors (e.g., for vendor risk management), that user can assess the probability of multiple portfolio companies experiencing an adverse cybersecurity event.

FIG. 1 shows aspects of system 100, which quantifies a cybersecurity risk level of a portfolio of companies using a risk multiplier and enables steps to reduce that risk. System 100 derives, compiles, or generates data sets and utilizes them to quantify a cybersecurity risk level for one or more portfolio companies, as well as an aggregate risk level for the portfolio itself. The quantified risk can be expressed using a multiplier, which can be a mathematical function or operator. According to an embodiment, the breach multiplier specifically quantifies the elevated risk due to a poorly diversified portfolio, which has an excess of common features, some of which are also shared with breached companies. It should be appreciated that the multiplier does not represent only a total amount of exposure across entities in a portfolio, but also is an expression of similarity of exposures across entities within a portfolio. The multiplier functions as a predictive value of the likelihood that a cybersecurity event (e.g., a catastrophic loss) will occur with respect to portfolio companies and can be used with a default, initial, or otherwise "standardized" cybersecurity risk level value (e.g., based on a randomly-sampled set of companies or a set of companies specified according to certain criteria) to express the portfolio's cybersecurity risk level. Further, as discussed herein, system 100 can utilize different methods to derive the feature sets used to generate the multiplier.

Using the multiplier, system 100 executes steps, or directs a user to execute steps, to mitigate portfolio risk within a minimal or otherwise optimum number of steps. For example, a user can be directed to replace certain portfolio companies with companies not in the portfolio, which themselves can be randomly selected or selected according to predefined criteria. Also, a user can be directed to change certain interdependencies of portfolio companies. For example, if two or more portfolio companies use a problematic web host or share an upstream vendor, system 100 can flag that issue in its multiplier algorithm and direct a user to create a new portfolio composition where, e.g., the web host is not included as a vendor. In this way, system 100 can create a portfolio of companies that have dependencies (e.g., first-degree dependencies, second-degree dependencies, and so on) that optimizes the portfolio's aggregate cybersecurity risk level.

System 100 can comprise a server and/or cloud-based computing platform configured to execute the steps described herein. Accordingly, system 100 is a particular purpose computing system designed, configured, or adapted to perform the methods described herein and can be communicatively coupled with a number of end user devices 101a-101n, which can be, e.g., a computer, tablet, Smartphone, or other similar end user computing device. Users can interact with system 100 using device 101 via one or more networks, such as network 102, which itself can comprise one or more of a local intranet, a LAN (Local Area Network), a WAN (Wide Area Network), a virtual private network (VPN), and the like. As will be apparent to those of skill in the art, communicative coupling can also be provided by, e.g., one or more of wireless connections, a synchronous optical network (SONET) connection, a digital TI, TN, El or E3 line, Digital Data Service (DDS) connection, DSL (Digital Subscriber Line) connection, an Ethernet connection, and the like.

System 100 comprises processor 103 and memory 104, which stores instructions for executing steps according to methods described herein. These modules may locally reside in memory 104 or in a separate location. Further, as will be understood by those of skill in the art, a "module" can include an application-specific integrated circuit ("ASIC"), an electronic circuit, a processor (shared, dedicated, or group) that executes one or more of software or firmware, a combinational logic circuit, and/or other suitable components that provide the described functionality.

A user can interact with system 100 at each end user station 101 using a graphical user interface (GUI) or the like, which itself can comprise one or more of dashboards, displays, notification centers, tables, and or other means to convey information relating to a portfolio, individual companies, cybersecurity events, risk levels, attributes, and user recommendations and action items, and the like.

During operation of system 100, one or more attributes of companies can be input into attribute module 105. The term "attribute" can be used synonymously with the term "attribute data" and each refers to data related to characteristics or features of an entity of interest. The attributes can relate to certain technologies utilized by a company such as email, website, social media, cloud services, servers, operation systems, and data storage (including, e.g., storage of website traffic, customer profiles, etc.). Also, non-technical attributes relating to a company can be input to attribute module 105. In some instances, it can be useful to utilize information relating to a company's products and services, financial history, employment characteristics, and the like. System 100 can determine what attributes to search for and use, or a user of system 100 can define or specify attributes of interest.

Attributes of a company can be collected directly from that company's network using previously existing network devices or new devices placed on the network or across different networks. This allows collection of proprietary, technical, and non-technical data relating to a company. System 100 can also gather attributes of interest for one or more companies by transmitting a query to each company, scraping online information from, e.g., websites, corporate filings, news sources, and public record databases and resources. In another embodiment, system 100 can also collect data from third party commercial sources and the like. To gather attribute information and input same to attribute module 105, data can be collected using a server or cloud-based device operating one or more software routines.

Attribute module 105 can rank or apply a weight to one or more attributes according to their influence on cybersecurity risk level. In an embodiment, an attribute weight is selected by an end user. For example, a portfolio manager working on behalf of an insurance company can determine that certain attributes, such as a company's technology area, technology vendors, and geographic region are important attributes for analyzing individual and aggregate cybersecurity risk. Accordingly, the user can assign a greater weight to such attributes.

System 100 can also determine how to weight attributes across different industries and the like. For example, if system 100 determines that the portfolio companies are hospitals, it can select attribute weights determined to be meaningful for medical practice. In any event, attribute weights can be adjusted and/or otherwise specified by system 100 or a user according to particular circumstances, preferences, and the like.

As mentioned, system 100 can utilize a machine learning model to quantity a portfolio's cybersecurity risk. Accordingly, company attribute information can be input to attribute module 105 during both a training period and an analysis period. In operation, system 100 can "learn" during a training period by, e.g., identifying patterns, categories, statistical relationships, etc., exhibited by training data. The result of the learning is then used to monitor whether new data exhibits the same patterns, categories, statistical relationships.

In operation of system 100, attribute module 105 can assign weights to certain attributes using information gathered during a training period. Based on attribute data relating to portfolio and/or non-portfolio companies analyzed during the training period, system 100 then makes informed decisions on the importance of different attributes. Accordingly, a description of an exemplary machine learning platform is helpful in understanding the inventive concepts described herein.

According to an embodiment, common attributes are identified and the significance of the identified common attributes can be expressed as a weight, ranking, prioritization, etc. By discovering patterns in historical and current data, machine learning can be utilized to make decisions in real-time about which attributes are indicative of a cybersecurity threat or a cybersecurity threat signature. For example, an increased likelihood of a cybersecurity threat may be discovered from one or more attributes even though the cybersecurity threat has not been seen before and no signature for the cybersecurity threat existed previously.

According to an embodiment, an automated predictive model first processes or filters raw supervised and/or unsupervised training data. A model can then be applied to the filtered data where, e.g., attributes or data fields corresponding to certain attributes that have no influence on cybersecurity risk level are eliminated, and the most significant attributes are heavily weighted. A multiplier is then generated by leveraging the foregoing aspects of the machine learning techniques, which itself is used to express the predicted cybersecurity risk for the portfolio.

In an embodiment, attribute data from various data sources can be evaluated in two separate data paths: (1) a real-time processing path, and (2) a batch processing path. Preferably, the evaluation of attribute data in these two data paths occurs concurrently. The real-time processing path is configured to continuously monitor and analyze the incoming attribute data (e.g., in the form of an unbounded data stream). To operate in real-time, the evaluation is performed primarily or exclusively on attribute data contemporaneously received with the data being generated by and/or received from the data source(s). In an embodiment, the real-time processing path excludes historical data (i.e., stored data pertaining to attributes analyzed in the past) from its evaluation. Alternatively, in an embodiment, the real-time processing path excludes third-party data from the evaluation in the real-time processing path. These example types of data that are excluded from the real-time path can be evaluated in the batch processing path.

Historical data and third party data may be used to create and improve the machine learning models employed to evaluate attribute data. Practically, the amount of such historical data and/or third party data can be potentially much larger than the real-time data stream. As such, the actual evaluation of the historical data tends to be slower. Consequently, in an embodiment, the real-time processing path does not use either or both the historical data and third party data as inputs. In other embodiments, historical and third party data may be used as inputs but the majority of the data used for evaluation in the real-time processing path still pertains to contemporaneous incoming attribute data. This is a consequence of the need to process the voluminous incoming attribute data quickly to obtain actionable information.

In the batch processing path, historical data and third-party data are processed optionally with the incoming real-time attribute data to, e.g., identify subtle attribute data indicative of cybersecurity risk. Batch processing may occur synchronously with real-time processing or in accordance with a predefined schedule.

Historical data can include data from different instantiations of the real-time data sources and may span time and geography. In some implementations, only an abridged version of the incoming attribute data is analyzed in the real-time processing path while a more complete version is stored as historical data. Accordingly, the historical data may, in one or more of these implementations, include attribute data that has more attributes than the abridged attribute data presented to the real-time processing path.

As in the real-time data path, actionable or relevant attribute data discovered by the batch analyzer may be acted upon automatically or may be presented to a user for a decision to take action. The action ultimately taken by a user can validate or invalidate conclusions reached by the batch analyzer and may serve as a source of feedback to the machine learning platform to improve its evaluation of subsequently processed data.

Attribute information processed by attribute module 105 can be used by comparison module 106 to generate a degree of similarity between companies-of-interest. A company of interest can be a portfolio company or a company not in a portfolio. For example, a company that experienced a cybersecurity event during a certain time period may be of interest. While the company that experienced the cybersecurity event may or may not be in a given portfolio, its attributes can be compared to companies in a portfolio, which are also companies-of-interest.

Also, it may be of interest to determine how many portfolio companies have attributes common to a company that experienced a cybersecurity event during a time period. If several portfolio companies share attributes with a company that experienced a cybersecurity event, it can be inferred that an occurrence of the cybersecurity event is more likely to occur at a portfolio company. This is exacerbated when there are several attributes common to the portfolio companies and/or the shared attributes are heavily weighted, i.e., assigned a greater weight based on their indication of an occurrence of a cybersecurity event.

The degree of similarity can be expressed in terms of a number of attributes common to two or more companies and/or the n-degrees of dependency between the attributes (and, therefore, the companies). Accordingly, comparison module 106 compares the attributes collected by attribute module 105 to determine a number of attributes common to the companies-of-interest and their degrees of dependencies. According to different embodiments, attribute module 105 and/or comparison module 106 filter and otherwise process attributes and comparison data by, e.g., assigning weights to attributes or set of attributes and the like.

In an embodiment, comparison module 106 generates a similarity score between companies-of-interest. The similarity score represents how similar a group of entities is to one another in view of (1) the number of attributes shared by companies, (2) the weight or relevance of the shared attributes, and (3) the degree of mutuality of the shared attributes.

The comparison or similarity data processed by comparison module 106 can be used by multiplier module 107 to generate a cybersecurity risk multiplier for a portfolio. The multiplier is a mathematical function or operator used to express the probability that a portfolio will experience a significant cybersecurity risk event.

Cybersecurity Risk Level Module 108 quantifies a portfolio's cybersecurity risk level based on the multiplier generated by multiplier module 107. That is, Cybersecurity Risk Level Module 108 generates a cybersecurity risk level for the portfolio of companies, which can be expressed as a function of the multiplier generated by multiplier generator module 107. The portfolio cybersecurity risk level can be represented as a fraction, a decimal, a percentage, and/or a normalized number in a range defined by a user or otherwise predetermined.

Utilizing action module 109, the portfolio cybersecurity risk level can be displayed by a graphical user interface at any end user station 101. In some embodiments, the cybersecurity risk level can be represented as a graph that illustrates the correlation among portfolio companies, as well as portfolio companies and non-portfolio companies. Companies can be graphically connected based on their number of shared attributes, the type or weight of shared attributes, and the degree of mutuality of the attributes.

As discussed herein, output of Cybersecurity Risk Level Module 108 can be utilized by action module 109 to generate steps that, if executed, will change the portfolio's cybersecurity risk level. In response to calculating a portfolio Cybersecurity Risk Level (CRL), action module 109 can be executed to provide the end user with some type of actionable feedback. For example, action module 109 can provide the end user with one or more actions that, if performed, will improve the cybersecurity risk level of the portfolio.

In one example, action module 109 can automatically identify attributes that, if changed, would affect the portfolio's cybersecurity risk level. For example, if high risk companies utilize service providers that use a particular CDN, action module 109 can output a recommendation that removing companies which use such same service providers will reduce portfolio risk level.

Therefore, an embodiment of system 100 can automatically provide the risk level generated by Cybersecurity Risk Level Module 108, expressed as a function of the multiplier generated by module 107, or other information to an end user, who can utilize that information to reduce portfolio risk level. If, for example, a new company is considered for inclusion in the portfolio, it may be unacceptable for inclusion if its attributes are high risk or otherwise similar to high risk companies.

Action module 109 can also identify attributes that are problematic or negatively impact portfolio cybersecurity risk level. For example, action module 109 can identify vendors, such as web service providers and cloud service providers as particularly problematic attributes. In some embodiments, action module 109 can also identify network parameters, such as firewall policies and the like, as problematic. Prompting the user to modify problematic shared attributes will likely decrease the cybersecurity risk level. Further, action module 109 can also determine key variables that, if changed, would negatively impact cybersecurity risk level, and accordingly, identify these variables to the end user as desirable.

User actions that can be taken in response to cybersecurity risk level information also includes replacing one or more portfolio companies with one or more companies that do not share problematic attributes. Likewise, an action item can require that a user add a new company to the portfolio that is determined to include positive attributes (i.e., attributes indicative of low cybersecurity risk), such as security personnel, strong information technology infrastructure and protocols, and the like. In one example, action module 109 provides an attribute profile of a company that, if added to the portfolio, would sufficiently reduce the portfolio cybersecurity risk level.

System 100 can also update portfolio cybersecurity risk level based on feedback received at module 110 from an end user. For example, if a user wants to determine what effect adding a proposed company to the portfolio will have on its current cybersecurity risk level, a profile of selected attributes of the proposed company can be input to system 100 via feedback module 110. Selected attributes of the proposed company are then utilized by system 100 to compile an updated (albeit hypothetical) portfolio cybersecurity risk level, which can be displayed to the user. Feedback module 110 can received feedback from a user or feedback automatically generated by components of system 100, such as devices 101.

Further, under different scenarios, the difference between a predicted cybersecurity risk level and a previous cybersecurity risk level can be compared to a threshold. In an embodiment, system 100 compares the predicted cybersecurity risk level change to a threshold to determine if inclusion of a proposed company in the portfolio is justified. There may be instances where a net change in cybersecurity risk level is required by system parameters and/or user requirements before a portfolio change is recommended.

System 100 can further indicate to a user why a portfolio cybersecurity risk level changes in a particular way or by a particular amount. That is, system 100 can analyze underlying system data and its impact on cybersecurity risk level. Accordingly, system 100 can construct a portfolio using data gathered from an analysis of variables for one or more companies.

For example, system 100 can generate a report that informs a user about the number and type of companies to include in a portfolio to satisfy a certain cybersecurity risk level. The generated report can indicate that a portfolio manager should include a certain percentage of clients in a first technology sector, a second technology sector, and so on. These sectors can be determined by comparing attributes of various companies across sectors that yield an acceptable portfolio cybersecurity risk level.

FIG. 2 shows a flow chart of steps performed to quantify a cybersecurity risk level of a portfolio of companies using a risk multiplier and enable steps to reduce that risk. The steps shown in FIG. 2 can be executed by a system for reducing a cybersecurity risk level of a portfolio of companies using a risk multiplier, such as system 100 shown in FIG. 1. The steps can be performed by processing logic that may comprise hardware (e.g., circuitry, dedicated logic, etc.), software (such as is run on a general purpose computer system or a dedicated machine), or a combination of both.

At step 201, an initial cybersecurity risk level of a portfolio of companies is determined. The initial determination can be performed in different ways. For example, a default risk level can be assigned to the portfolio based on, e.g., statistical data obtained from randomly sampled companies. The statistical sampling can be performed by implementing the supervised machine learning concepts discussed above with respect to system 100. For example, during a time period such a training period, a default or baseline risk level can be approximated by analyzing occurrences of cybersecurity events across a random sampling of companies. Analyzing the occurrences can involve evaluating different attributes of companies that experience a cybersecurity event and weighting those attributes. In some instances, this can yield a more meaningful baseline or default risk level for the portfolio of companies.

The initial risk can also be determined by sampling companies over a time period that are known to have attributes common to a significant number of portfolio companies. For example, where a number of portfolio companies share a common web host, or utilize products or service offered by the same vendor(s), embodiments can limit a sampling to companies used to approximate an initial or default risk level to companies that have the same attributes. As such, an initial cybersecurity risk level can be generated, at least in part, by comparing cybersecurity data (e.g., attributes and/or their n-degree dependencies) relating companies in a portfolio of interest to cybersecurity data relating to companies in a portfolio comprising randomly selected companies.

Certain attributes can also be weighted according to their determined influence on cybersecurity risk level. That is, the identified attributes that are shared by a portfolio company and a company that experienced a cybersecurity risk event can be weighted according to their correlation with the occurrence of the cybersecurity risk event. Subsequently, a probability that portfolio companies sharing the identified attributes will also experience a cybersecurity risk event will depend on the weights assigned to the identified common attributes. In this way, the initial cybersecurity risk level for the portfolio can have more context, and/or can provide a more meaningful value for which the multiplier is applied.

The weight assigned to an attribute can depend on a degree of dependency associated with that attribute. As discussed in more detail below, attributes can be analyzed according to their degree of dependency on or similarity to one another. According to an embodiment, a first-degree attribute can be defined as an attribute that is directly common to at least two companies in the portfolio, a second-degree attribute can be defined as an attribute not directly common to the at least two companies, but directly common to the first-degree attribute, a third-degree attribute can be defined as an attribute not directly common to the at least two companies or the first-degree attribute, but directly common to the second-degree attribute, and so on.

According to an embodiment, first-degree attributes can be assigned greater weight than second-degree attributes, second-degree attributes can be assigned a greater weight than third-degree attributes, and so on. Recognizing not only attributes shared by companies, e.g., first-degree attributes, but further removed commonalities such as higher degree attributes, allows more insight into relationships between portfolio companies and other companies and the likelihood that a cybersecurity risk event at one company will propagate to a portfolio company. Obviously, this provides a user with enriched information and more degrees of freedom in executing steps to reduce portfolio risk level. A user is not limited to replacing one company for another based on shared attributes, but is able to select one or more companies for inclusion in a portfolio that are determined to not, e.g., utilize a problematic or high risk vendor.

Further, the initial risk level can be based on attributes of the portfolio companies themselves. The attributes of the portfolio companies can be used alone, or in combination with the foregoing features, to establish an initial risk level. For example, in an embodiment, certain attributes can be analyzed and a comparison performed to estimate how the initial risk of the portfolio likely deviates from a randomly sampled group of companies, or a group of companies that have attributes known to be common to companies in the portfolio.

The attributes themselves can be thought of as "internal" to a company or "external" to a company. Examples of internal attributes include, e.g., a host that is identified as vulnerable, a browser or operating system determined to be obsolete, an incidence of malware events that exceeds a threshold during a given time period (e.g., a month or a year), a number and type of open ports, a slow patching cadence for updating software with known vulnerabilities, a cipher identified as being weak, a newly-added subdomain, inadequate use of firewalls and intrusion detection systems, and the like. Examples of external attributes include social network sentiment, improper use of social media accounts, as well as leaked passwords and the like.

The initial cybersecurity risk level can be expressed in different ways, depending on user preferences, end-use applications, and the like. In an embodiment, the initial cybersecurity risk level can be expressed as an absolute value, or score, to be used as a reference. In other embodiments, the initial risk level can be expressed in terms of its relationship to another standard or reference value. For example, the initial value can be expressed as a percentage or the like, e.g., 8 (x), 1.2 (x), etc., where a value (x) can represent a "neutral" or otherwise accepted reference risk level.

According to an embodiment, step 201 is optional, where a standardized value is used as a reference for subsequent calculations. Accordingly, a subsequently quantified risk level of a portfolio is expressed as a deviation (as determined by a multiplier) from the standardized value. The standardized value can be used as a starting point or reference in all instances.

At step 202, at least one company that experienced a cybersecurity risk event during a certain time period is identified. The identified company, and attributes of the company, can serve as a starting point for determining a multiplier used to quantify the cybersecurity risk level of the portfolio. The company can be a portfolio company, or a company not in the portfolio, while certain of its attributes will be compared to those of portfolio companies. Also, the time period in which the company experienced the cybersecurity event can be all or part of a training period, as described herein. On the other hand, the time period can be randomly selected or selected about a window in which cybersecurity events occur or are thought to have occurred (e.g., a time window about a period in which cybersecurity events increase or peak). In any event, whether or not historical, the time period is preferably close enough in time to the performance of steps described herein to be relevant.

At step 203, at least one attribute that is common to the company identified at step 202 and at least one company in the portfolio is identified. The identified common attributes are compared in a meaningful way to determine their correlation with cybersecurity risk. According to inventive concepts it is recognized that some attributes have minimal impact on cybersecurity risk level, while other attributes clearly influence same. For example, the sophistication of a web service vendor, its gross revenue, and its technology sector may strongly influence cybersecurity risk level, while geographic location, state of incorporation, number of employees may not. Accordingly, attributes that strongly influence cybersecurity risk will be assigned a greater weight than those that do not.

At step 204, a degree of mutuality is generated for the attributes identified at step 203. Notably, the inventive concepts not only recognize a number and weight of attributes shared by companies, but a degree of mutuality of the shared attributes. Accordingly, embodiments provide greater insight to portfolio cybersecurity risk level and offer significantly more options for a user to reduce portfolio risk level. That is, in determining risk level, a user is not confined to comparing attributes shared by two or more companies, but can also compare attributes common to companies that, while not in the portfolio, influence cybersecurity risk level of the portfolio.

By way of example, consider defining a first-degree attribute as an attribute that is directly common to at least two companies in the portfolio, a second-degree attribute as an attribute not directly common to the at least two companies, but directly common to the first-degree attribute, a third-degree attribute as an attribute not directly common to the at least two companies or the first-degree attribute, but common to the second-degree attribute, and so on. In that case, further consider companies C1-C4 in a portfolio, where Vendor V1 supplies certain functionality implemented in security software used by C1 and C2, Vendor V2 supplies the same functionality implemented in security software used by C3 and C4, and Vendor VV1 supplies web authentication services to Vendors V1 and V2. In this example, Vendor V1 (or the service it provides) is a first-degree attribute for Companies C1 and C2, while Vendor V2 (or the service it provides) is a first-degree attribute for Companies C3 and C4. With respect to companies C1-C4, Vendor VV1 is a second-degree attribute where companies C1 and C2 receive the functionality implemented their security software from a vendor different than companies C3 and C4, but Vendors V1 and V2, and therefore, indirectly, companies C1-C4 share the same web authentication features supplied by Vendor VV1. It could also be said that Vendor VV1 is a first-degree attribute of Vendors V1 and V2.

At step 205, a cybersecurity risk multiplier is generated. The multiplier is a mathematical function or operator used to express the portfolio's cybersecurity risk level. The multiplier can be a factor used to arrive at a mathematical product, or can be expressed as a more complex function or operator comprising, e.g., logarithmic or exponent components. Further, according to an embodiment, the multiplier can be an operator capable of showing a rate of change or gradient in a portfolio's cybersecurity risk level with respect to time, portfolio composition, and other factors. In this way, the multiplier can be utilized to see what factors create the greatest change or most heavily influence portfolio risk level. Such factors will be different across portfolios, and as such, the multiplier can comprise different contributions in different embodiments to more clearly track a risk level for any given portfolio.

According to an embodiment, the multiplier represents a similarity between portfolio companies and companies that experienced a cybersecurity event within a predefined feature space (where the feature space is defined by a supervised learning model) that is scaled and can be measured against a benchmark. The multiplier can be based on one or more of the number of portfolio companies having attributes common to a company that experienced a cybersecurity risk event, the number of the shared attributes themselves, the generated weight assigned to the shared attributes, and the degrees of dependency of the shared attributes.

Further, the multiplier is generated from data gathered using machine learning techniques discussed herein. A statistical model can be trained by first estimating a degree of similarity between companies in randomly composed portfolios and analyzing the number of K identified or discovered cybersecurity events in those portfolios over a period of time. The K identified or discovered cybersecurity events can be a combination of significant cybersecurity events and dependencies, where $K=0, 1, 2, \ldots n$. Then, a distribution of the portfolio of interest and the number of identified cybersecurity events for the randomly composed portfolios are used to fit a Bayesian model of likelihood of multiple cybersecurity events.

In other words, to generate the multiplier, machine learning techniques are used to analyze both a portfolio of interest and companies that experienced a cybersecurity event in a certain time period (e.g., the past six (6) months). From this, an estimate of the risk that multiple companies will experience a cybersecurity event is generated. According to an embodiment, the value of the multiplier is constrained to vary between 0 and 2 (x), where 1 (x) is the probability that a randomly composed portfolio will experience a cybersecurity event.

According to an embodiment, the multiplier can be used to express a cybersecurity risk level where:

$$CB\_PROBABILITY(D\text{-}SCORE,N)=CATASTROPH\text{-}IC\_BREACH\_PROBABILITY(D\text{-}SCORE,N)=PROBABILITY(NUMBER\_OF\_BREACH>1|D\text{-}SCORE,N)," \tag{1}$$

$$MULTIPLIER(D\text{-}SCORE,N)=CB\_PROBABILITY(D\text{-}SCORE,N)/CB\_PROBABILITY(D\text{-}SCORE=BENCHMARK,N), \tag{2}$$

where:

"CB_PROBABILITY" represents the probability that a portfolio of interest will experience a cybersecurity risk event, and is a function of "D-SCORE," which is a quantitative measure of the diversification level of the portfolio of interest within the predefined feature space;

"N" represents the number of companies in the portfolio of interest;

"PROBABILITY (D-SCORE)" represents a probability density function of the quantitative measure of diversification level of the portfolio of interest (D-SCORE), which is estimated by sampling randomly generated portfolios. According to one embodiment, this conditional probability is estimated by fitting a Kernel density model on the d-scores of randomly generated portfolios;

"PROBABILITY (NUMBER_OF_BREACH>1|D-SCORE, N)" represents a probability of a number of breach events occurring in the portfolio of interest, which is conditioned on the quantitative measure of diversification level of the portfolio of interest (D-SCORE).

"PROBABILITY (NUMBER_OF_BREACH>1|D-SCORE, N)" is proportional to PROBABILITY (D-SCORE|NUMBER_OF_BREACH>1, N)*PROBABILITY (NUMBER_OF_BREACH>1, N)

"PROBABILITY (D-SCORE|NUMBER_OF_BREACH>1)" represents a probability of the quantitative measure of diversification level of the portfolio of interest (D-SCORE), which is conditioned on a number of breach events occurring in the portfolio of interest. According to one embodiment, this conditional probability is estimated by fitting a Kernel density model on the d-scores of randomly generated portfolios;

"PROBABILITY (NUMBER_OF_BREACH, N)" represents a joint probability of the number of breaches in a portfolio of size N. According to one embodiment, this probability follows a binomial distribution as binomial (N,p), where p=a number of companies experiencing a cybersecurity event divided by N;

"NUMBER_OF_BREACH" represents the number of vendors that experience a cyber incident within a pre-defined time interval;

"MULTIPLIER" represents Breach Multiplier;

"CB_PROBABILITY (D-SCORE=BENCHMARK, N) represents a joint probability of D-SCORE and portfolio size N; and "BENCHMARK" is the mean of D-SCORE for a set of randomly selected portfolios.

The model used to generate the multiplier can be validated using a training model. During a training period, a weight for each attribute, attribute type, cybersecurity event, or cybersecurity event type can be generated. The most heavily weighted attributes and/or events can be selected by weight (e.g., the top ten (10) percent). A sampling pool can then be obtained by querying a different number of common attributes and/or event types. A portfolio can then be composed by randomly selecting from the sampling pool. The model can be trained and tested using portfolios of different sizes, e.g., randomly selected between a size of ten (10) to one hundred (100) companies.

At step 206, a portfolio cybersecurity risk level is generated as a function of the multiplier generated at step 205. Practically, the generated portfolio cybersecurity risk corresponds to a probability that a cybersecurity risk event will occur with respect to one or more portfolio companies, and depends on the number of shared attributes previously identified and their degrees of dependency. In other words, the generated portfolio cybersecurity risk level represents the likelihood one or more companies in a portfolio will experience a cybersecurity event in view of its degree of similarity to a company or companies that experienced such an event. The degree of similarity is directly related to the shared attributes, the weight of the attributes, and degrees of mutuality of the shared attributes, as discussed herein. Again, as mentioned above, some attributes can have minimal or no impact on the cybersecurity risk level, and such variables may be assigned a correspondingly small weight. If, for example, a shared attribute is not included in the risk level calculation by the end user the variable has no impact on the portfolio cybersecurity risk level.

The portfolio cybersecurity risk level can be expressed as an absolute value or as a relative value. For example, using the multiplier generated at step 205, the portfolio cybersecurity risk level generated at step 206 can be thought of as a mathematical product of, e.g., (1) the multiplier, and (2) an initial portfolio risk level or some other default or standardized value. As discussed, the initial portfolio risk level can be generated by applying a certain value to the portfolio itself, or can be based upon, e.g., sampling companies over a time period-whether the sampling is random or constrained to a particular set of companies that satisfy certain criteria. In any event, the machine learning technique discussed herein can be utilized to provide a baseline or standard value, or otherwise assign an initial portfolio risk level.

At step 207, a tool is enabled for reducing the portfolio's cybersecurity risk level. For example, if a portfolio is determined to have a high multiplier, and as a result, an increased cybersecurity risk level, portfolio companies that use problematic vendors can be investigated and/or replaced. Consistent with the foregoing description, enabling a tool to reduce a portfolio's cybersecurity risk level may involve displaying variable data fields and/or tools that allow a user to implement a number of changes to reduce the risk level. As an example, an interactive tool can be displayed to a user that comprises a list or series of available actions the user can execute to reduce the risk level. As mentioned herein, the actions can include removing a company from the portfolio, as well as replacing it with one or more companies. The one or more replacement companies can be considered less problematic or less risky than the replaced company insomuch as the replacement companies may not share one or more attributes with a company that experience a cybersecurity risk event. On the other hand, the replacement companies can be randomly selected, or selected based on their similarity (or shared attributes) with other portfolio companies that are determined to be less risky. Further, when the inventive concepts are used for vendor risk management, portfolio companies can be instructed to remediate shared issues (e.g. open ports, etc.) as a mechanism for reducing risk.

In some instances, a user may wish to remove one or more problematic or risky companies, thereby reducing the size of the portfolio and constraining it to companies that satisfy certain criteria or otherwise are determined to not have shared attributes or dependency (again, of any n-degree) with a company that experienced a cybersecurity risk event. By removing one or more companies that are at an increased risk from the portfolio, the aggregate risk level for the portfolio advantageously decreases.

A user can also view the effects of its actions have on the portfolio's risk level. After a user executes one or more steps enabled at step 207, an updated or refined portfolio risk level can be generated and displayed to the user along with a new set of enabled steps for execution. This can be thought of as a feedback loop operating with feedback input by the user to the system.

At step 208, feedback is received and further action is taken with respect to the generated portfolio cybersecurity risk level. The feedback can be received as an automated response generated by the system, or as a manually-entered response from a user. For example, feedback can be received from an individual, such as a portfolio manager, that is manually entered at one or more end user stations. On the other hand, the feedback can be received from a network or system device that generates the feedback. For example, an end user software routine can receive the output, compare the output to a determined threshold or series of metrics, and respond with feedback to yield an updated input that better conforms to the threshold or metrics. The end user software routine may require that a portfolio cybersecurity risk level be under a certain number and, if that condition is not satisfied, may transmit a proposed company profile for consideration in the portfolio. Should that proposed company's profile be considered and sufficient lower the portfolio cybersecurity risk level, the output may be accepted and passed along to other system companies for further analysis, and the like.

In view of the foregoing, feedback can be expressed in various forms, such as a suggestion, specifically required action(s), option, or report. In any event, an object can be to compare the portfolio cybersecurity risk level to a benchmark or other threshold over some period of time. In this way, a portfolio manager (employed by, e.g., an insurance company) can track the portfolio's aggregated cybersecurity risk level across an adjustable time frame. Doing so enables longer term analysis of the portfolio's risk level over time, and the manager's exposure in view of same. This, of course, allows a manager to make meaningful business decisions regarding the composition of the portfolio, and cast, willingness, and ability to underwrite the portfolio.

Figure 3A:
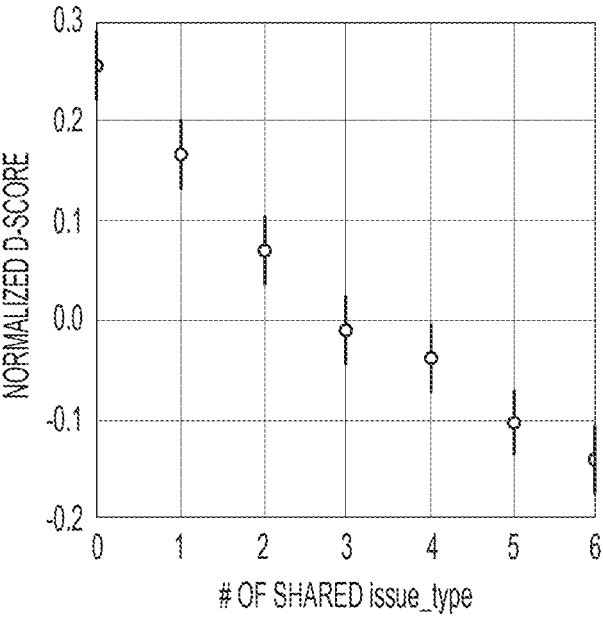
FIG. 3A shows a relationship between a risk score and number of shared attributes according to an embodiment.
Figure 3B:
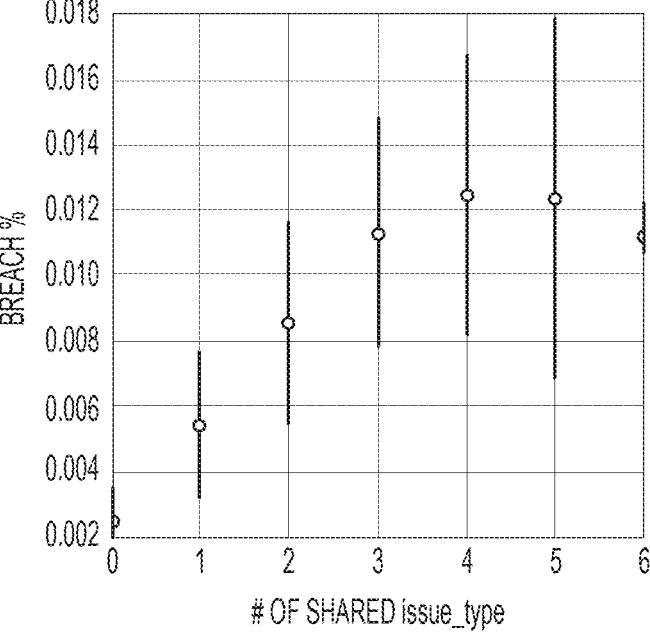
FIG. 3B shows a relationship between the likelihood a company will experience a cybersecurity risk event and a number of attributes it shares with a company that experienced a cybersecurity risk event according to an embodiment.

FIGS. 3A and 3B graphically illustrate data provided by an embodiment with respect to randomly composed portfolios having between twenty (20) and one hundred and fifty (150) companies. The data illustrates trends derived from a comparison between portfolio companies and companies that experienced a cybersecurity event Attributes of interest included third party vendors and industry type, and the portfolios were composed by enforcing a number of attributes in the portfolio. As seen in FIG. 3A, the normalized d-score decreases generally in linear fashion with an increase in the number of shared attributes. FIG. 3B shows that the likelihood of a company experiencing a cybersecurity event increases as the number of shared attributes increases.

Figure 4A:
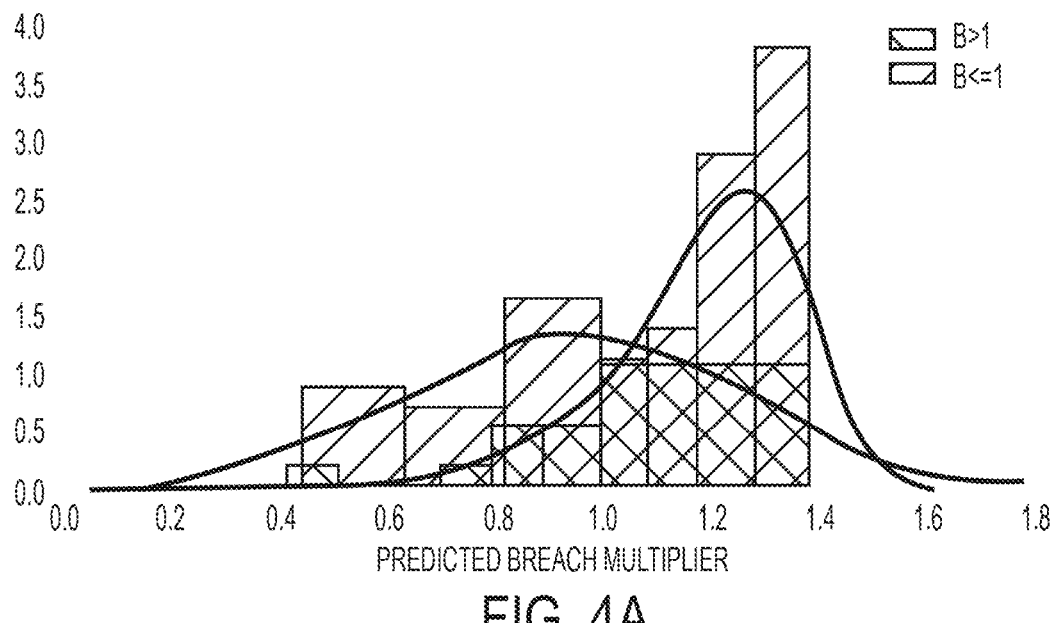
FIG. 4A shows a probability density function of multiplier values for portfolios of companies with different counts for co-occurrence of cyber data breach over two-year time period according to an embodiment.
Figure 4B:
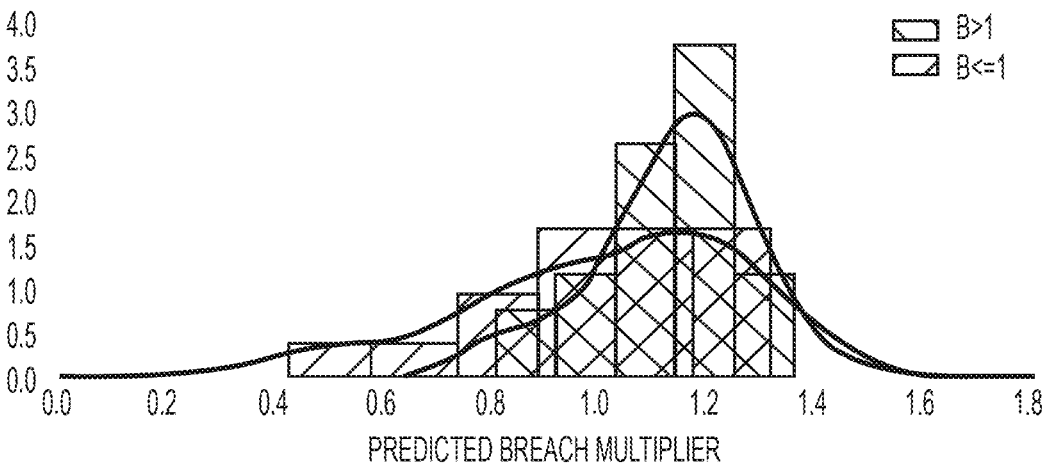
FIG. 4B shows a probability density function of multiplier values for portfolios of companies with different counts for co-occurrence of cyber data breach over one-year time period according to an embodiment.

FIG. 4A illustrates a probability density function of multiplier values for positive portfolio B>1 vs. negative portfolio B≤1, in which B is the number of cybersecurity events over a two (2) year time period. FIG. 4B illustrates a probability density function of multiplier values for positive portfolio B>1 vs. negative portfolio B≤1, in which B is the number of cybersecurity events over a one (1) year time period. As seen, with respect to performance for a randomly composed portfolio, recall rate is 70% and accuracy rate is 68%.

Figure 5:
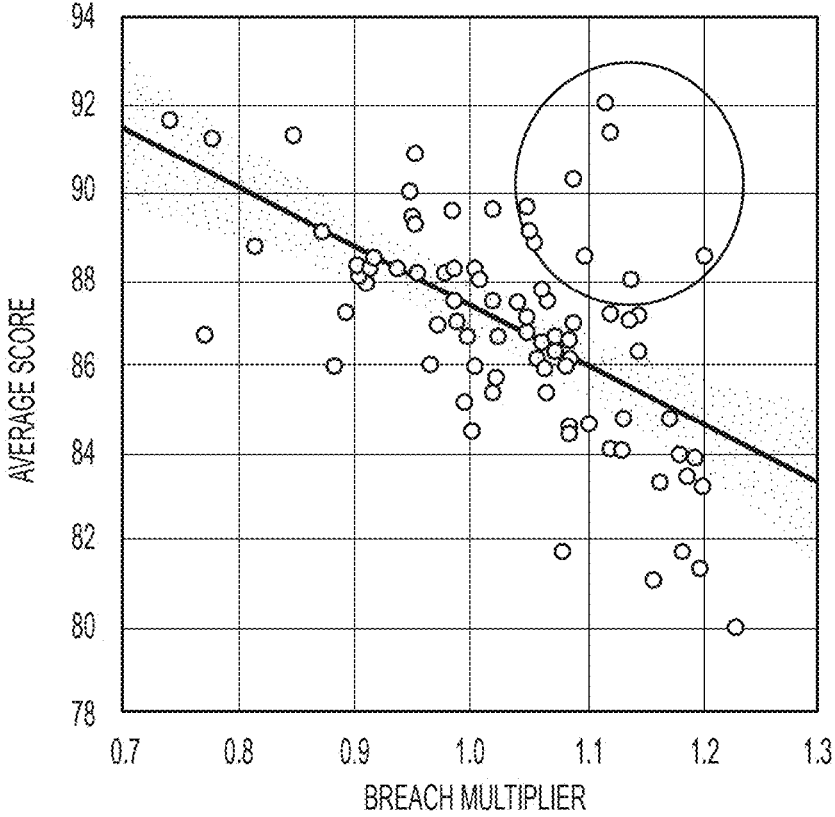
FIG. 5 shows multiplier values as a function of average cybersecurity risk score according to an embodiment.

FIG. 5 illustrates multiplier values as a function of average score. As seen, portfolios with more common attributes tend to have lower total scores. An entity with a high total score has lower cybersecurity risk than an entity with a low total score. According to FIG. 5, statistical multiplier values are partially correlated with total score. As the multiplier also depends on the mutuality between companies, the multiplier detects a portfolio of good total score with low diversification, as marked by the circle.

Figure 6A:
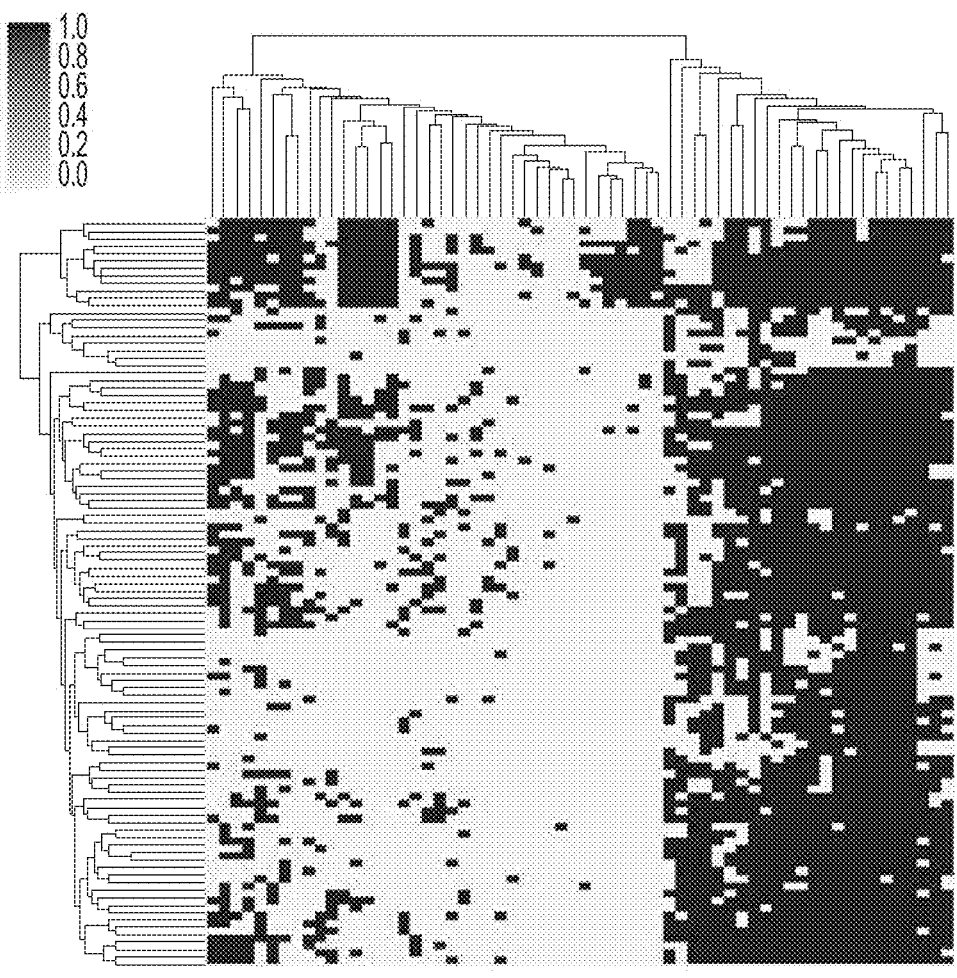
FIG. 6A illustrates clusters of common attributes among companies for portfolio companies that have a high multiplier value and a low total score according to an embodiment.
Figure 6B:
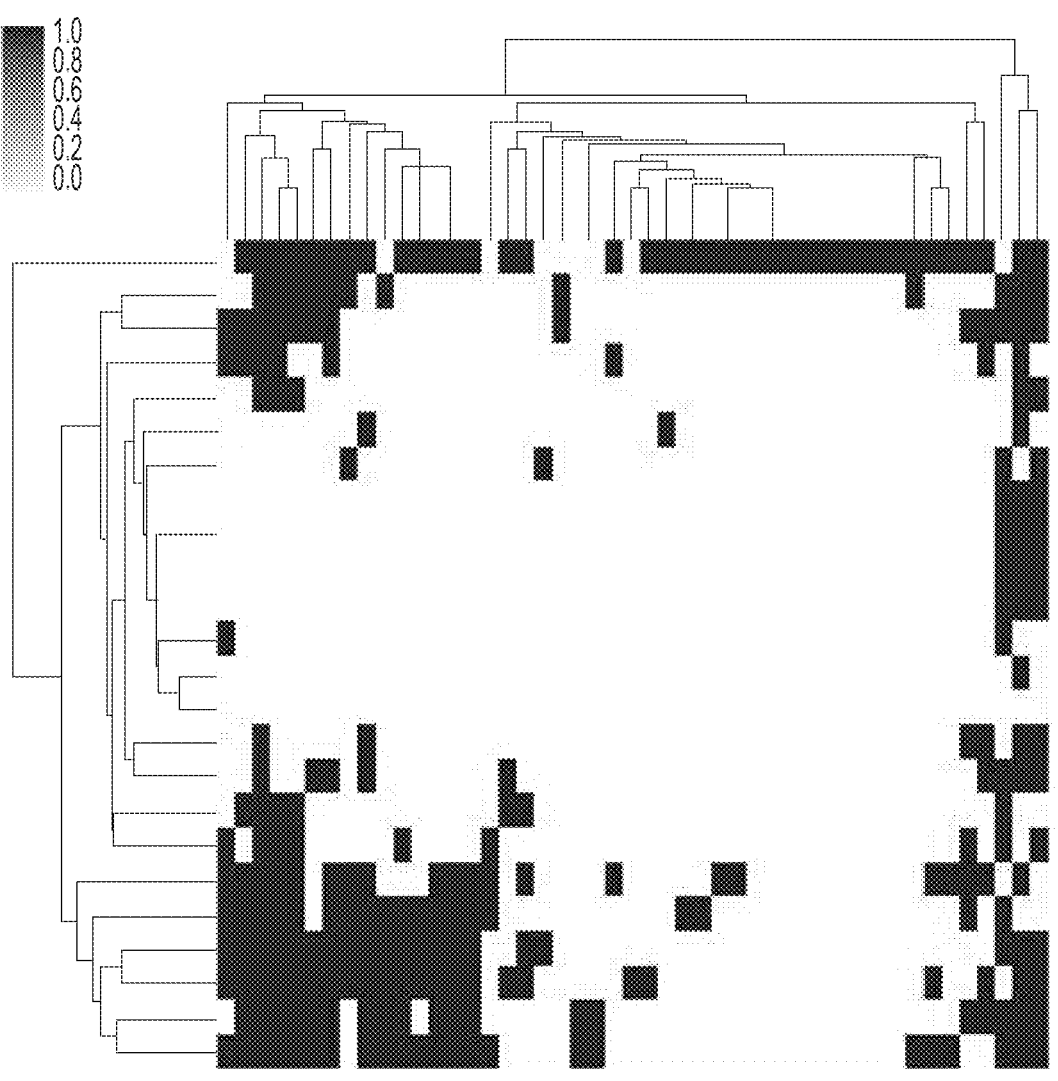
FIG. 6B illustrates clusters of common attributes among companies for portfolio companies that have a low multiplier value and a high total score according to an embodiment.

FIG. 6A is a heat map of cybersecurity attributes of a portfolio comprised of companies that have a high multiplier value and a low total score and FIG. 6B [INSERT] is heat map of cybersecurity attributes of portfolio comprised of companies that have a low multiplier value and a high total score. As seen, certain attributes are indicative of clusters of companies most likely to experience a cybersecurity risk event.

Figure 7:
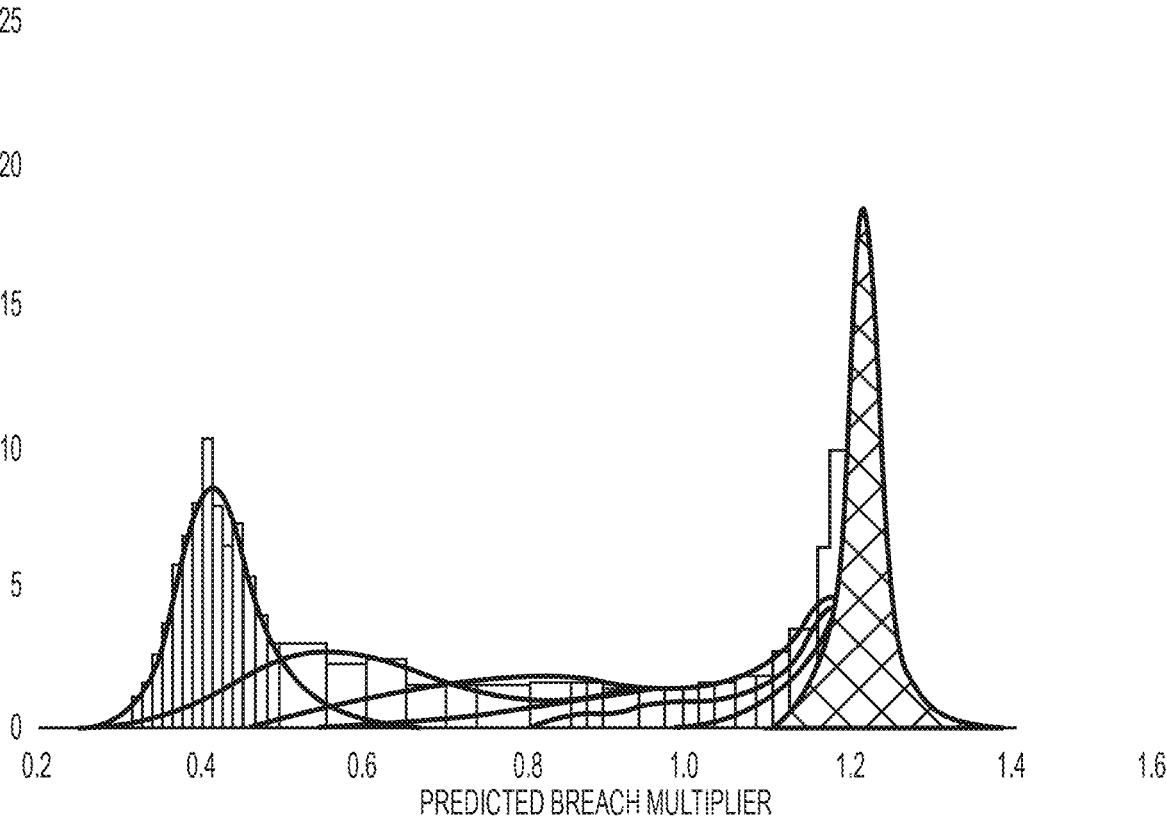
FIG. 7 shows the probability density functions of multiplier values for different numbers of common attributes according to an embodiment.

FIG. 7 shows the probability density functions of multiplier values for a different number of common attributes. In other words, FIG. 7 shows how multiplier values map to categorical levels of numbers of shared attributes among companies in a portfolio.

Certain units described in this specification have been labeled as modules in order to more particularly emphasize their implementation independence. A module is "[a] self-contained hardware or software component that interacts with a larger system." Alan Freedman, "The Computer Glossary" 268 (8th ed. 1998). A module may comprise a machine- or machines-executable instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for example, comprise one or more physical or logical blocks of computer instructions that may be organized as an object, procedure, or function. Nevertheless, the executables of an identified module need not be physically located together, but may comprise disparate instructions stored in different locations that, when joined logically together, comprise the module, and when executed by the processor, achieve the stated data transformation. A module of executable code may be a single instruction, or many instructions, and may even be distributed over several different code segments, among different programs, and/or across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the foregoing description, numerous specific details are provided, such as examples of programming, software modules, user selections, network transactions, database queries, database structures, hardware modules, hardware circuits, hardware chips, etc., to provide a thorough understanding of the present embodiments. One skilled in the relevant art will recognize, however, that the disclosure may be practiced without one or more of the specific details, or with other methods, components, materials, and so forth. In other instances, well-known structures, materials, or operations are not shown or described in detail to avoid obscuring aspects of the disclosure.

In the following description, numerous details are set forth to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.).

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. Moreover, the scope of the present application is not intended to be limited to the particular embodiments of the process, machine, manufacture, composition of matter, means, methods, and steps described in the specification.

The invention claimed is:

1. A method for dynamically scoring a cybersecurity risk of a portfolio of companies, the method comprising:
   receiving, by one or more processors, attribute data indicative of cybersecurity risks of companies;
   identifying, by the one or more processors and based on the attribute data, at least one attribute that is common to a company that experienced a cybersecurity risk event and the portfolio of companies;
   determining, by the one or more processors, a cybersecurity risk multiplier for the portfolio of companies based on a number of the at least one attribute; and
   outputting, by the one or more processors, a cybersecurity risk level of the portfolio of companies based on the cybersecurity risk multiplier.

2. The method of claim 1, further comprising:
   determining, by the one or more processors, an initial cybersecurity risk level of the portfolio of companies based on cybersecurity data related to the portfolio of companies; and
   generating, by the one or more processors, the cybersecurity risk level based on the initial cybersecurity risk level and the cybersecurity risk multiplier.

3. The method of claim 2, where the cybersecurity risk level is expressed as a product of the initial cybersecurity risk level and the cybersecurity risk multiplier.

4. The method of claim 1, further comprising:
   outputting, by the one or more processors, one or more actions to reduce the cybersecurity risk level.

5. The method of claim 4, where the one or more actions comprise an action to remove a company from the portfolio of companies, an action to replace one of the companies in the portfolio of companies with a company that is not included in the portfolio of companies, or a combination thereof.

6. The method of claim 4, further comprising:
   receiving, by the one or more processors, user input indicating a selected action of the one or more actions; and
   initiating, by the one or more processors, the selected action based on the user input.

7. The method of claim 1, further comprising:
   prior to determining the cybersecurity risk multiplier, weighting, by the one or more processors, the at least one attribute based on correlation with incidences of cybersecurity risk events.

8. An apparatus for dynamically scoring a cybersecurity risk of a portfolio of companies, the apparatus comprising:
   a memory;
   one or more processors coupled to the memory, the one or more processors configured to:
   receive attribute data indicative of cybersecurity risks of companies;

identify, based on the attribute data, at least one attribute that is common to a company that experienced a cybersecurity risk event and the portfolio of companies;

determine a cybersecurity risk multiplier for the portfolio of companies based on a number of the at least one attribute; and output a cybersecurity risk level of the portfolio of companies based on the cybersecurity risk multiplier.

9. The apparatus of claim 8, where the company that experienced the cybersecurity risk event is in the portfolio of companies.

10. The apparatus of claim 8, where the company that experienced the cybersecurity risk event is not in the portfolio of companies.

11. The apparatus of claim 8, where the at least one attribute comprises an internal attribute that is shared by companies in the portfolio of companies.

12. The apparatus of claim 11, where the internal attribute comprises a vulnerable host, an obsolete user agent, a number of new malware events, an open port, a slow patching cadence, inadequate use of firewalls, inadequate use of intrusion detection systems, or a combination thereof.

13. The apparatus of claim 8, where the at least one attribute comprises an external attribute that is shared by companies in the portfolio of companies and one or more companies that are not in the portfolio of companies.

14. The apparatus of claim 13, where the external attribute comprises inadequate use of social media accounts, lost or stolen passwords, inadequate social network sentiment, or a combination thereof.

15. A method for reducing a cybersecurity risk of a portfolio of companies, the method comprising:

receiving, by one or more processors, attribute data indicative of cybersecurity risks of companies;

assigning weights to attributes associated with the attribute data;

identifying at least one attribute between at least one company in the portfolio and at least one company that has experienced a cybersecurity risk event;

calculating a cybersecurity risk level for the portfolio based on the weights of the common attributes;

outputting one or more actions to reduce the cybersecurity risk level; and updating the cybersecurity risk level based on the one or more actions.

16. The method of claim 15, further comprising:

Adjusting the weights of the attributes based on a new cybersecurity risk event.

17. The method of claim 15, where the one or more actions comprise removing a company from the portfolio, adding a company to the portfolio, or modifying cybersecurity measures of companies in the portfolio.

18. The method of claim 15, further comprising:

generating, by the one or more processors, a cybersecurity risk multiplier based on the common attributes; and using the cybersecurity risk multiplier in calculating the cybersecurity risk level.

19. An apparatus for reducing a cybersecurity risk of a portfolio of companies, the apparatus comprising:

a memory;

one or more processors coupled to the memory, the one or more processors configured to:

receive, by one or more processors, attribute data indicative of cybersecurity risks of companies;

assign weights to attributes associated with the attribute data;

identify at least one attribute between at least one company in the portfolio and at least one company that has experienced a cybersecurity risk event;

calculate a cybersecurity risk level for the portfolio based on the weights of the common attributes;

output one or more actions to reduce the cybersecurity risk level; and update the cybersecurity risk level based on the one or more actions.

20. The apparatus of claim 19, where the one or more processors are further configured to:

adjust the weights of the attributes based on new cybersecurity risk events.

21. The apparatus of claim 19, where the one or more actions comprise removing a company from the portfolio, adding a company to the portfolio, or modifying cybersecurity measures of companies in the portfolio.

22. The apparatus of claim 19, where the one or more processors are further configured to:

generate a cybersecurity risk multiplier based on the common attributes; and use the cybersecurity risk multiplier in calculating the cybersecurity risk level.

23. The apparatus of claim 19, where the one or more processors are further configured to:

determine degrees of mutuality for the common attributes; and use the degrees of mutuality in calculating the cybersecurity risk level.

24. The apparatus of claim 19, where the one or more processors are further configured to:

output a graphical user interface displaying the cybersecurity risk level and the recommended actions.

* * * * *